(12) United States Patent
Shyu (10) Patent No.: US 6,392,974 B2
(45) Date of Patent: May 21, 2002

(54) PLAYBACK METHOD AND APPARATUS FOR READING AUDIO PROGRAMS RECORDED ON A RECORD CARRIER

(75) Inventor: Rong-Fuh Shyu, Hsinchu (TW)

(73) Assignee: Winbond Electronics Corporation, Hsinchu (TW)

( * ) Notice: Subject to any disclaimer, the term of this patent is extended or adjusted under 35 U.S.C. 154(b) by 0 days.

(21) Appl. No.: 09/757,060

(22) Filed: Jan. 9, 2001

Related U.S. Application Data (62) Division of application No. 09/092,720, filed on Jun. 5, 1998, now Pat. No. 6,192,014.

(51) Int. Cl.$^7$ ................................................. G11B 7/00
(52) U.S. Cl. ........................ 369/59.25; 369/59.26; 369/47.16; 369/47.2; 369/47.21
(58) Field of Search .......................... 369/47.15, 47.19, 369/47.2, 47.22, 47.23, 47.27, 47.31, 47.16, 59.25, 59.26, 47.21

(56) References Cited

U.S. PATENT DOCUMENTS

| | | |
|---|---|---|
| 5,245,600 A | 9/1993 | Yamaguchi et al. |
| 5,519,681 A | 5/1996 | Maeda et al. |
| 5,646,931 A | 7/1997 | Terasaki |
| 5,850,379 A | 12/1998 | Moriya et al. |
| 5,850,381 A | 12/1998 | Miyano |
| 5,850,500 A * | 12/1998 | Hirayama et al. ............. 386/97 |
| 5,859,821 A | 1/1999 | Koya et al. |
| 5,867,466 A | 2/1999 | Igrashi et al. |
| 5,933,398 A * | 8/1999 | Fujinami ..................... 369/49 |
| 6,118,741 A * | 9/2000 | Mimnagh et al. ............. 369/47 |

\* cited by examiner

Primary Examiner—Nabil Hindi
(74) Attorney, Agent, or Firm—Fish & Richardson P.C.

(57) ABSTRACT

A playback apparatus for reading a record carrier includes a drive unit for sending out audio sectors that were recorded on the record carrier, an ID extractor for extracting the ID codes of the audio sectors that were sent out by the drive unit, a retrieval controller for receiving the ID codes extracted by the ID extractor, and a sector data extractor for receiving data fields of the audio sectors that were sent out by the drive unit. The sector data extractor is controlled by the retrieval controller to extract the data fields of appropriate ones of the audio sectors when the ID codes thereof are recognized by the retrieval controller as belonging to a selected one of the audio programs.

12 Claims, 5 Drawing Sheets

PLAYBACK METHOD AND APPARATUS FOR READING AUDIO PROGRAMS RECORDED ON A RECORD CARRIER

35 USC §120 this application is a divisional application of U.S. Ser. No. 09/092,720. filed Jun. 5, 1998 now U.S. Pat. No. 6,192,014.

BACKGROUND OF THE INVENTION

1. Field of the Invention

The invention relates to a playback method and apparatus for reading audio programs that were recorded on a record carrier.

2. Description of the Related Art

Figure 1:
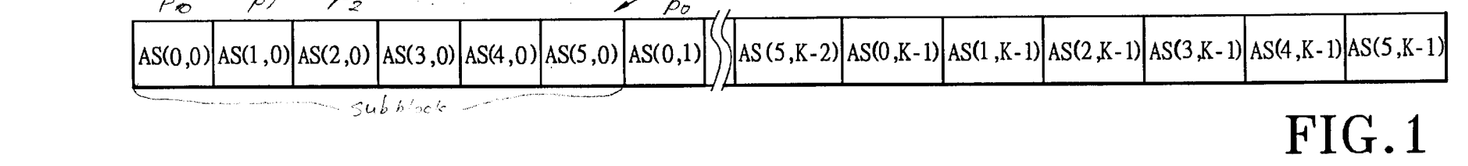
FIG. 1 illustrates a block of a track of a record carrier to be read by the playback method and apparatus of this invention.

In a co-pending U.S. patent application, entitled "Record Carrier, and Recording Method and Apparatus for Recording Audio Programs on a Track of a Record Carrier," and filed by the Applicant, there is disclosed a record carrier, such as a compact disc, which includes a number of tracks having a number of blocks. As shown in FIG. 1, each block (B) includes a plurality of interleaved compressed audio programs, and is grouped into a number of consecutive sub-blocks. Each of the compressed audio programs is segmented to form a number of consecutive audio sectors $(AS(i,j), i=0$ to $5, j=0$ to $k-1)$ that is equal in number to the sub-blocks. The audio sectors $AS(i,j)$ of the compressed audio programs are arranged among the sub-blocks such that a jth one of the audio sectors $AS(i,j)$ of each of the compressed audio programs is disposed in a jth one of the sub-blocks.

Figure 2:
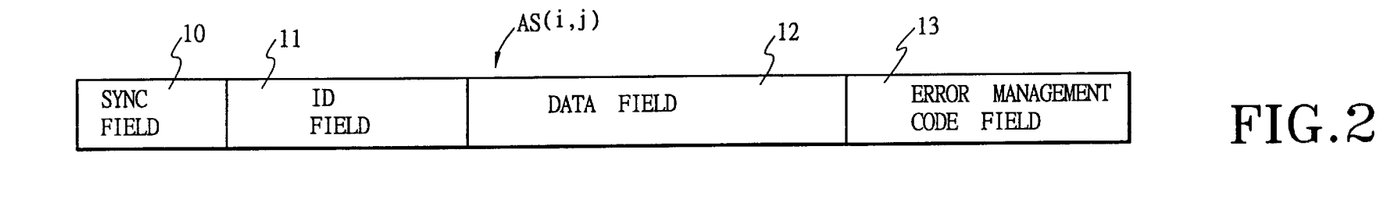
FIG. 2 illustrates an audio sector of the block shown in FIG. 1.

The compressed audio programs are assigned with an ascending order of program numbers, and the audio sectors $AS(i,j)$ in each of the sub-blocks are arranged in the ascending order of the compressed audio programs to which the audio sectors $AS(i,j)$ belong. As shown in FIG. 2, each of the audio sectors $AS(i,j)$ includes a SYNC field 10 for storing a SYNC word, an ID field 11 for storing an ID code that is unique for each of the audio sectors $AS(i,j)$, a data field 12, and an error management code field 13 for storing an error management code.

Figure 3:
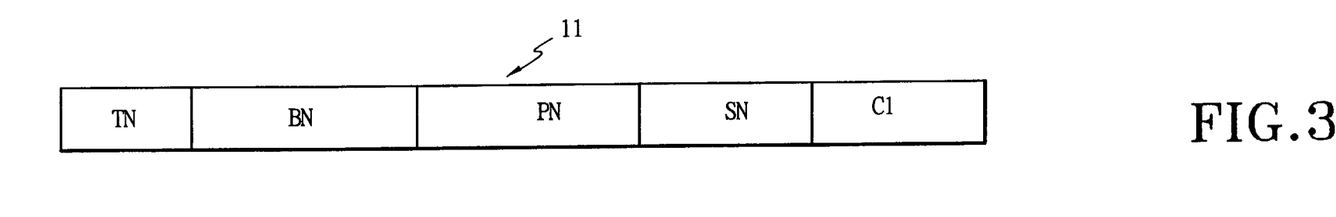
FIG. 3 illustrates an ID field of the audio sector shown in FIG. 2.

Referring to FIG. 3, the ID field 11 includes a track number (TN), a block number (BN), a program number (PN), a sector number (SN), and connection information (CI). The track number (TN) indicates the track (T) of the record carrier to which the audio sector $AS(i,j)$ belongs. The block number (BN) indicates the block (B) on the track to which the audio sector $AS(i,j)$ belongs. The program number (PN) indicates the compressed audio program on the block (B) to which the audio sector $AS(i,j)$ belongs, e.g. i=0 to 5 as shown in FIG. 1. The sector number (SN) indicates the sector number of the audio sector $AS(i,j)$ in the compressed audio program to which the audio sector $AS(i,j)$ belongs, e.g. j=0 to k-1 as shown in FIG. 1. The connection information (CI) contains flags for facilitating continuous playback of the compressed audio programs when the record carrier is read. The flags can include an end of program (EOP) flag, an end of block (EOB) flag, an end of track (EOT) flag, and an end of disc (EOD) flag. Particularly, the last audio sector of each of the compressed audio programs, i.e. $AS(i,k-1)$, has an EOP flag. The last audio sector of each block (B), i.e. $AS(5,k-1)$, further has an EOB flag. The last audio sector $AS(5,k-1)$ of the last block (B) in a track further has an EOT flag. The last audio sector $AS(5,k-1)$ of the last block (B) in the last track of the record carrier further has an EOD flag.

By virtue of the interleaving arrangement of the audio sectors on the record carrier, a high density of compressed audio programs can be recorded on tracks of the record carrier while retaining the constant linear velocity, i.e. 1.5 Mbits/sec, of a compact disc drive with a compressed audio bit rate of about 224 Kbits/sec, thereby obviating the need for the compact disc drive to alternate frequently between stalling and advancing states to minimize degradation of the compact disc drive when the compressed audio programs are read from the record carrier.

SUMMARY OF THE INVENTION

The object of the present invention is to provide a playback method and apparatus for reading audio programs that were recorded on the record carrier described beforehand.

According to this invention, a playback apparatus is capable of reading a record carrier having at least one track. The track has at least one block. The block includes a plurality of interleaved audio programs and is grouped into a number of consecutive sub-blocks. Each of the audio programs is segmented to form a number of consecutive audio sectors that is equal in number to the sub-blocks. The audio sectors of the audio programs are arranged among the sub-blocks such that a jth one of the audio sectors of each of the audio programs is disposed in a jth one of the sub-blocks. Each of the audio sectors includes an ID field for storing an ID code that is unique for each of the audio sectors, and a data field. The playback apparatus comprises drive means, an ID extractor, a retrieval controller, and a sector data extractor. The drive means is adapted to send out the audio sectors that were recorded on the record carrier. The ID extractor is connected to the drive means for extracting the ID codes of the audio sectors that were sent out by the drive means. The retrieval controller is connected to the ID extractor to receive the ID codes extracted thereby. The sector data extractor is connected to the drive means and the retrieval controller, and receives the data fields of the audio sectors that were sent out by the drive means. The sector data extractor is controlled by the retrieval controller to extract the data fields of appropriate ones of the audio sectors when the ID codes thereof are recognized by the retrieval controller as belonging to a selected one of the audio programs.

In one aspect of the invention, a playback method for reading a block of a track of a record carrier comprises:

(a) sending out the audio sectors of the block;

(b) extracting the ID codes of the audio sectors that were sent out;

(c) extracting appropriate ones of the audio sectors when the ID codes thereof are recognized as belonging to a selected one of the audio programs;

(d) upon recognition of an end-of-program flag in the ID code of a last one of the audio sectors of the selected one of the audio programs, resending the audio sectors of the block;

(e) repeating steps (b) and (c) to extract the audio sectors that belong to another one of the audio programs; and (f) repeating steps (d) and (e) to extract the audio sectors of other ones of the audio programs until an end-of-block flag in the ID code of the last one of the audio sectors of a last one of the audio programs in the block is recognized.

In another aspect of the invention, a playback method for reading the blocks of a track of a record carrier comprises:

(a) sending out the audio sectors of a selected one of the blocks;

(b) extracting the ID codes of the audio sectors that were sent out;

(c) extracting appropriate ones of the audio sectors when the ID codes thereof are recognized as belonging to a selected one of the audio programs;

(d) upon recognition of an end-of-program flag in the ID code of a last one of the audio sectors of the selected one of the audio programs in the selected one of the blocks, sending out the audio sectors of another one of the blocks;

(e) repeating steps (b) and (c) to extract the audio sectors that belong to a selected one of the audio programs of said another one of the blocks;

(f) repeating steps (d) and (e) to extract the audio sectors that belong to a selected one of the audio programs of other ones of the blocks until the end-of-program flag in the ID code of the last one of the audio sectors of the selected one of the audio programs in a last one of the blocks of the track is recognized;

(g) resending the audio sectors of the track;

(h) repeating steps (b) to (f) to extract the audio sectors of another one of the audio programs in each of the blocks; and (i) repeating steps (g) and (h) to extract the audio sectors of other ones of the audio programs in each of the blocks until an end-of-track flag in the ID code of the last one of the audio sectors of a last one of the audio programs in the last one of the blocks of the track is recognized.

In still another aspect of the invention, a playback method for reading tracks of a record carrier comprises:

(a) sending out the audio sectors of one of the blocks of a selected one of the tracks;

(b) extracting the ID codes of the audio sectors that were sent out;

(c) extracting appropriate ones of the audio sectors when the ID codes thereof are recognized as belonging to a selected one of the audio programs;

(d) upon recognition of an end-of-program flag in the ID code of a last one of the audio sectors of the selected one of the audio programs, sending out the audio sectors of another one of the blocks of the selected one of the tracks;

(e) repeating steps (b) and (c) to extract the audio sectors that belong to a selected one of the audio programs of said another one of the blocks;

(f) repeating steps (d) and (e) to extract the audio sectors that belong to a selected one of the audio programs of other ones of the blocks of the selected one of the tracks until the end-of-program flag in the ID code of the last one of the audio sectors of the selected one of the audio programs in a last one of the blocks of the selected one of the tracks is recognized;

(g) sending out the audio sectors of one of the blocks of another one of the tracks;

(h) repeating steps (b) to (f) to extract the audio sectors of a selected one of the audio programs in each of the blocks of said another one of the tracks;

(i) repeating steps (g) and (h) to extract the audio sectors of a selected one of the audio programs in each of the blocks of other ones of the tracks until the end-of-program flag in the ID code of the last one of the audio sectors of the selected one of the audio programs in the last one of the blocks of a last one of the tracks of the record carrier is recognized;

(j) resending the audio sectors of the tracks of the record carrier;

(k) repeating steps (b) to (i) to extract the audio sectors of another one of the audio programs in each of the blocks in each of the tracks of the record carrier; and (l) repeating steps (j) and (k) to extract the audio sectors of other ones of the audio programs in each of the blocks in each of the tracks of the record carrier until an end-of-disc flag in the ID code of the last one of the audio sectors of the last one of the audio programs in the last one of the blocks of the last one of the tracks of the record carrier is recognized.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 4:
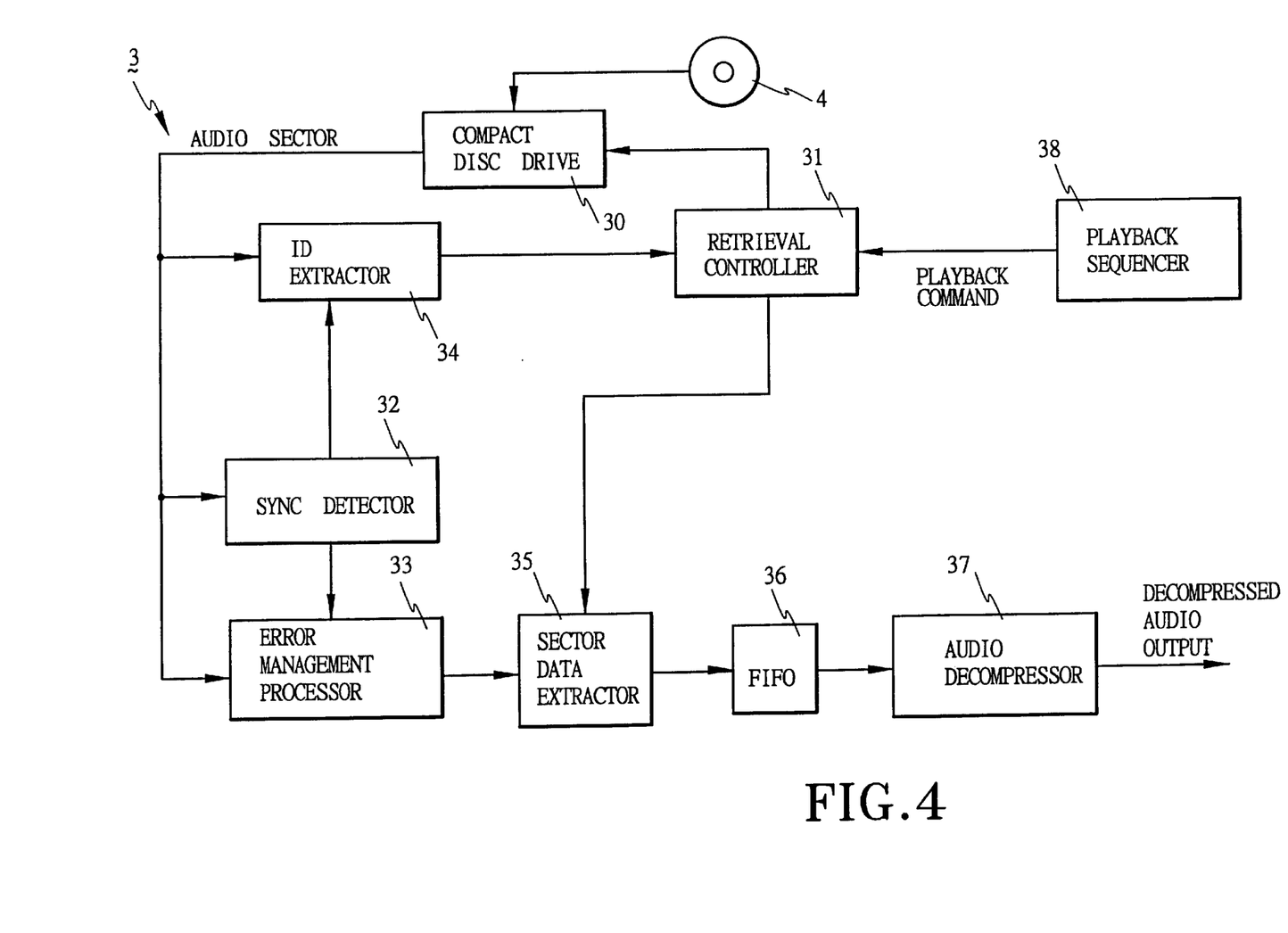
FIG. 4 is a schematic circuit block diagram of the preferred embodiment of a playback apparatus for reading compressed audio programs from tracks of the record carrier of FIGS. 1 to 3 in accordance with this invention.

FIG. 4 illustrates the preferred embodiment of a playback apparatus 3 for reading compressed audio programs from tracks of the record carrier disclosed in the aforementioned co-pending U.S. patent application, the entire disclosure of which is incorporated herein by reference. The playback apparatus 3 includes a drive unit, such as a compact disc drive 30, which is used to send out the audio sectors that were recorded on the record carrier 4 under the control of a retrieval controller 31. The compact disc drive 30 provides the audio sectors to a SYNC detector 32, an error management processor 33 and an ID extractor 34.

The SYNC detector 32 detects the SYNC word in an audio sector sent by the compact disc drive 30, and activates the error management processor 33 and the ID extractor 34 to receive the respective fields of the audio sector upon detection of the SYNC word.

Upon being activated by the SYNC detector 32, the error management processor 33 receives the data field and the error management code field of the audio sector, and proceeds to perform error management operations, such as error detection and error correction, on the data field according to the error management code in the error management code field.

Upon being activated by the SYNC detector 32, the ID extractor 34 extracts the ID code from the ID field of the audio sector, and sends the extracted ID code to the retrieval controller 31.

The retrieval controller 31 receives the ID code from the ID extractor 34 and a playback command from a playback sequencer 38 to determine which audio sector on the record carrier 4 must be read for playback of a selected audio program. The retrieval controller 31 outputs an enable signal and controls the reading of audio sectors by the compact disc drive 30 according to the playback command that was issued and the ID code of the previous audio sector that was read.

A sector data extractor 35 receives the output of the error management processor 33, and extracts the data field of an appropriate one of the audio sectors therefrom upon receipt of the enable signal from the retrieval controller 31. The sector data extractor 35 stores the extracted data fields in a first-in, first-out (FIFO) memory device 36. The FIFO memory device 36 collects the extracted data fields and provides the same to an audio decompressor 37 for decompression so as to recover the original audio programs. The audio decompressor 37 decompresses the data fields stored in the FIFO memory device 36 according to the compression algorithm of a corresponding audio compressor used during the recording of the audio programs on the record carrier 4.

If the audio sectors recorded on the record carrier 4 are scrambled, a corresponding descrambler (not shown) is needed at the output side of the compact disc drive 30 to descramble the audio sectors before they can be decoded.

Figure 5:
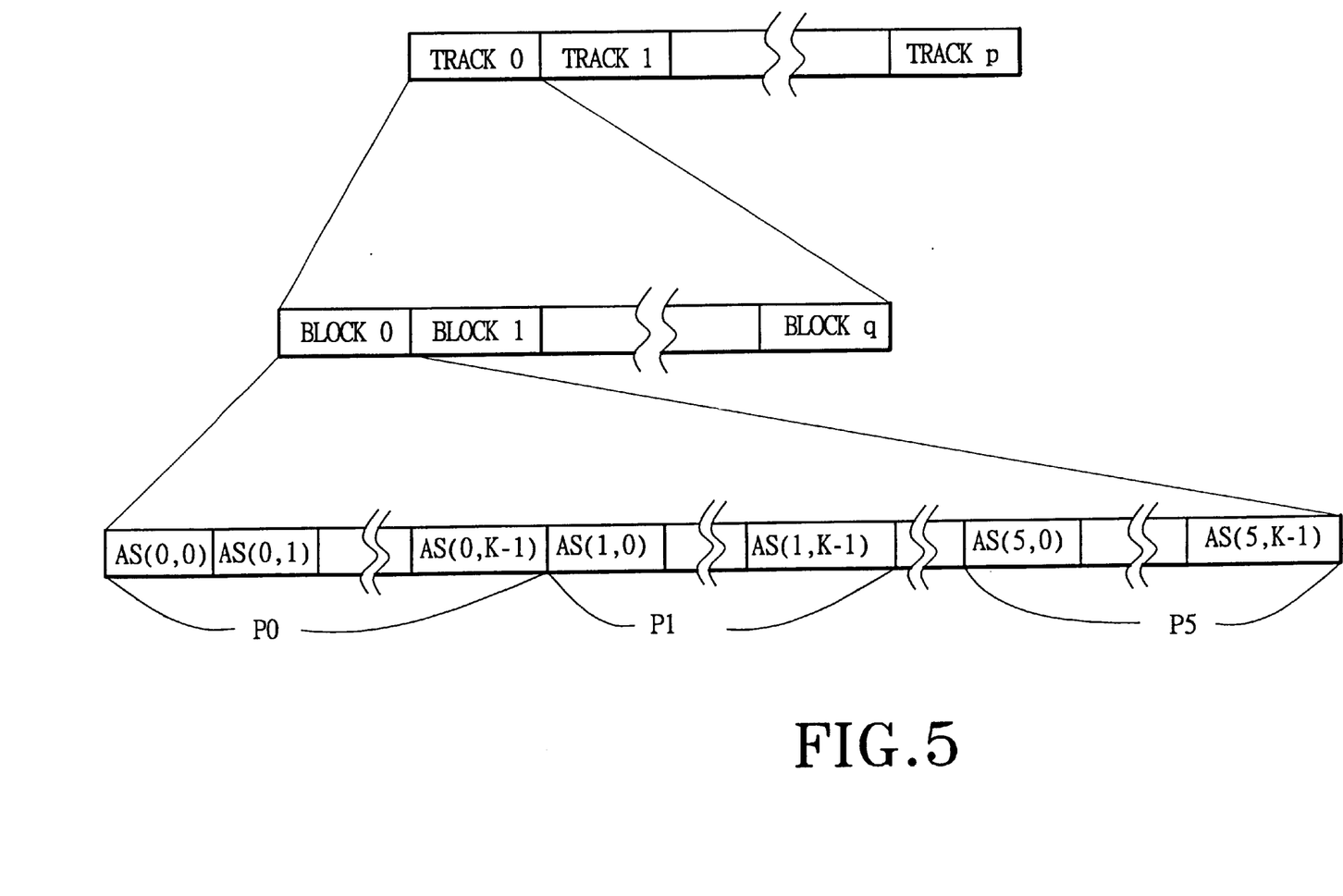
FIG. 5 illustrates one embodiment of how audio sectors are retrieved for playback of audio programs that were recorded on the tracks of the record carrier of FIGS. 1 to 3.

FIG. 5 illustrates one embodiment of how audio sectors are retrieved for playback of audio programs that were recorded on the tracks of the record carrier of FIGS. 1 to 3. The playback sequence is conducted track by track starting from Track 0, which is the first track of the record carrier, to Track p, which is the last track of the record carrier. In each track, the playback sequence is conducted block by block starting from Block 0, which is the first block of the track, to Block q, which is the last block of the track. In each block, the playback sequence can be conducted program by program starting from a first audio program (e.g. P0) of the block to a last audio program (e.g. P5) of the block.

When retrieving the audio sectors of the first audio program P0, the audio sectors belonging to the other audio programs (e.g. P1–P5) are ignored, and only the audio sectors AS(0,0), AS(0,1) to AS(0,k−1) corresponding to the first audio program P0 are extracted from the interleaved audio sectors. The same situation holds when the audio sectors belonging to the other audio programs (e.g. P1–P5) are retrieved.

When the last audio sector of an audio program (e.g. AS(0,k−1) of P0) is retrieved, the interleaved audio sectors of the same block are resent once again starting from the first audio sector of the block for retrieving the audio sectors belonging to another audio program (e.g. P1).

The above procedure is repeated for the remaining audio programs in the same block, thereby resulting in the need to send the audio sectors of the same block six times to retrieve the six audio programs in the latter.

When the last audio sector of the last audio program in Block 0 (e.g. AS(5,k−1) of P5) is retrieved, reading of the next block (e.g. Block 1) follows in the aforementioned manner.

The retrieval process described beforehand is under the control of the retrieval controller 31 of FIG. 4. The retrieval controller 31 controls the compact disc drive 30 to send out the audio sectors of one of the blocks repeatedly for a number of times equal to the number of the audio programs in each of the blocks. The retrieval controller 31 further controls the sector data extractor 35 to extract the data fields of the audio sectors of one of the audio programs in said one of the blocks each time the audio sectors of said one of the blocks are sent out by the compact disc drive 30.

With reference to FIG. 5, the first preferred embodiment of a playback method according to the present invention comprises the following steps:

(1) Initially, the retrieval controller 31 detects the playback command from the playback sequencer 38.

(2) Upon detecting the playback command, the retrieval controller 31 enables the compact disc drive 30 to send out the audio sectors of a selected one of the blocks (e.g. Block 0) in a selected one of the tracks (e.g. Track 0) of the record carrier 4.

(3) The ID codes of the audio sectors that were sent out by the compact disc drive 30 are extracted by the ID extractor 34, and are provided to the retrieval controller 31.

(4) The retrieval controller 31 then enables the sector data extractor 35 to extract appropriate ones of the audio sectors from the interleaved audio sectors of the selected one of the blocks (e.g. Block 0) when the ID codes thereof are recognized as belonging to a selected one of the audio programs (e.g. P0).

(5) When an end-of-program (EOP) flag in the ID code of a last one of the audio sectors of the selected one of the audio programs (e.g. P0) is recognized, the retrieval controller 31 enables the compact disc drive 30 to resend the audio sectors of the selected one of the blocks (e.g. Block 0).

(6) Steps (3) and (4) are repeated to enable the sector data extractor 35 to extract the audio sectors that belong to another one of the audio programs (e.g. P1) from the interleaved audio sectors of the selected one of the blocks (e.g. Block 0).

(7) Steps (5) and (6) are repeated to enable the sector data extractor 35 to extract the audio sectors of other ones of the audio programs (e.g. P2–P5) until an end-of-block (EOB) flag in the ID code of the last one of the audio sectors of the last one of the audio programs (e.g. P5) is recognized.

(8) Thereafter, the retrieval controller 31 enables the compact disc drive 30 to send out the audio sectors of another one of the blocks (e.g. Block 1) in the selected one of the tracks (e.g. Track 0) of the record carrier 4.

(9) Steps (3) to (7) are repeated to enable the sector data extractor 35 to extract the audio sectors of the audio programs (e.g. P0–P5) in said another one of the blocks (e.g. Block 1).

(10) Steps (8) and (9) are repeated to enable the sector data extractor 35 to extract the audio sectors of the audio programs (e.g. P0–P5) of other ones of the blocks (e.g. Block 2–Block q) of the selected one of the tracks (e.g. Track 0) of the record carrier 4 until an end-of-track (EOT) flag in the ID code of the last one of the audio sectors of the last one of the audio programs (e.g. P5) in the last one of the blocks (e.g. Block q) of the selected one of the tracks (e.g. Track 0) is recognized.

(11) Subsequently, the retrieval controller 31 enables the compact disc drive 30 to send out the audio sectors of another one of the tracks (e.g. Track 1) of the record carrier 4.

(12) Steps (3) to (10) are repeated to enable the sector data extractor 35 to extract the audio sectors of the audioprograms (e.g. P0–P5) in the blocks (e.g. Block 0–Block q) of said another one of the tracks (e.g. Track 1) of the record carrier 4.

(13) Steps (11) and (12) are repeated to enable the sector data extractor 35 to extract the audio sectors of the audioprograms (e.g. P0–P5) in the blocks (e.g. Block 0–Block q) of other ones of the tracks (e.g. Track 2–Track p) of the record carrier 4 until an end-of-disc (EOD) flag in the ID code of the last one of the audio sectors of the last one of the audio programs (e.g. P5) in the last one of the blocks (e.g. Block q) of the last one of the tracks (e.g. Track p) is recognized.

The extracted audio sector sequence shown in the bottom row of FIG. 5 is stored in the FIFO memory device 36 of FIG. 4. The audio decompressor 37 decompresses the data stored in the FIFO memory device 36 to recover the original audio data for playback.

Figure 6:
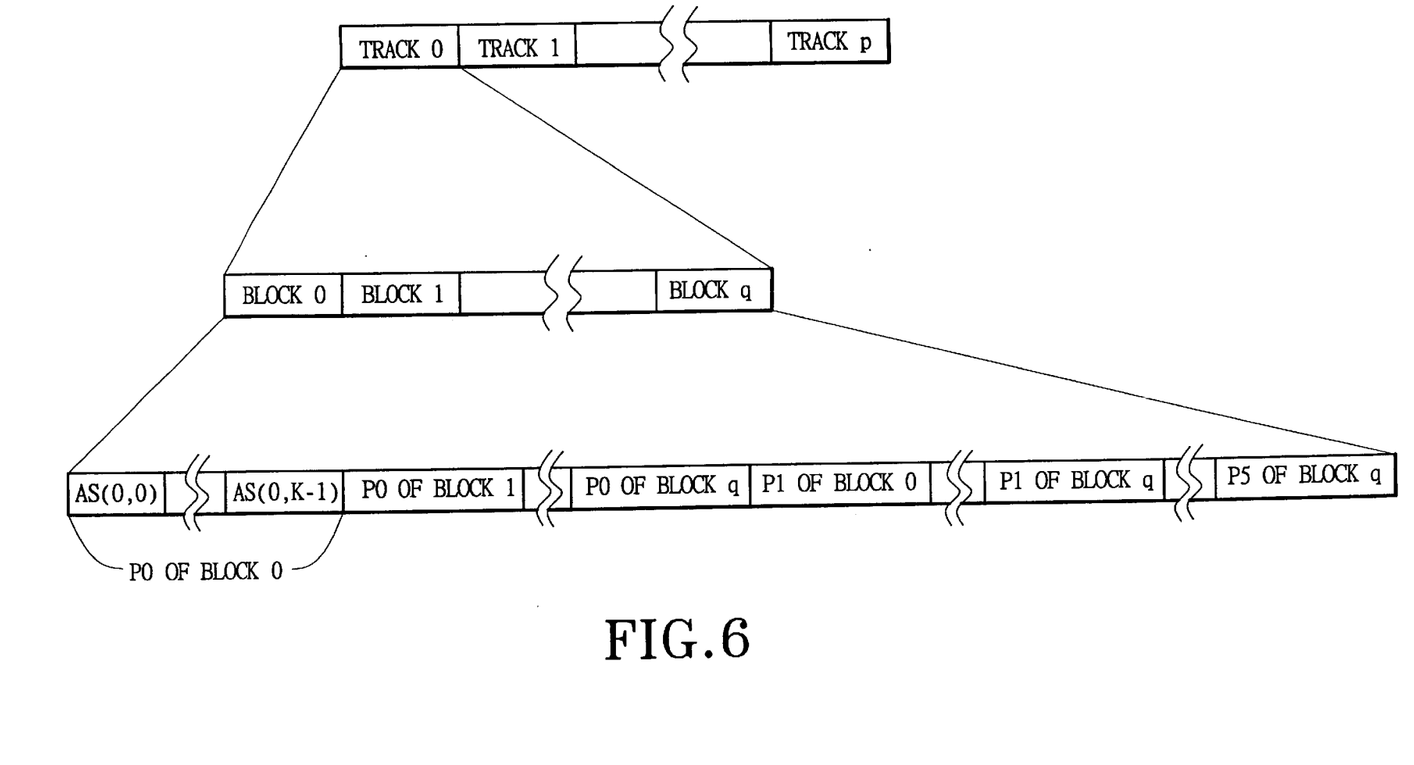
FIG. 6 illustrates another embodiment of how audio sectors are retrieved for playback of audio programs that were recorded on the tracks of the record carrier of FIGS. 1 to 3.

FIG. 6 illustrates another embodiment of how audio sectors are retrieved for playback of audio programs that were recorded on the tracks of the record carrier of FIGS. 1 to 3. Like the embodiment of FIG. 5, the playback sequence is conducted track by track starting from Track 0, which is the first track of the record carrier, to Track p, which is the last track of the record carrier. However, in each track, the playback sequence is conducted starting from a first program (e.g. P0) of the first block (e.g. Block 0), followed by a first program (e.g. P0) of the second block (e.g. Block 1), and so on up to the first program (e.g. P0) of the last block (e.g. Block q). Thereafter, the same track is read again to retrieve a second program (e.g. P1) of the first block (e.g. Block 0), followed by a second program (e.g. P1) of the second block (e.g. Block 1), and so on up to the second program (e.g. P1) of the last block (e.g. Block q). When retrieving a specified audio program in a block, only the audio sectors corresponding to the specified audio program are extracted from the interleaved audio sectors. The above procedure is repeated for the remaining audio programs in the same track, thereby resulting in the need to send the audio sectors of the same track six times to retrieve the audio programs in the latter. Thus, the number of times audio sectors are resent is fewer than that in the previous embodiment. Retrieval of the next track can commence after the last program (e.g. P5) of the last block (e.g. Block q) of a previous track has been retrieved.

The retrieval process of this embodiment is under the control of the retrieval controller 31 of FIG. 4. The retrieval controller 31 controls the compact disc drive 30 to send out the audio sectors of one of the tracks repeatedly for a number of times equal to the number of the audio programs in each of the blocks. The retrieval controller 31 further controls the sector data extractor 35 to extract the audio sectors of one of the audio programs in each of the blocks of said one of the tracks each time the audio sectors of said one of the tracks are sent out by the compact disc drive 30.

With reference to FIG. 6, the second preferred embodiment of a playback method according to the present invention comprises the following steps:

(1) Initially, the retrieval controller 31 detects the playback command from the playback sequencer 38.

(2) Upon detecting the playback command, the retrieval controller 31 enables the compact disc drive 30 to send out the audio sectors of a selected one of the blocks (e.g. Block 0) in a selected one of the tracks (e.g. Track 0) of the record carrier 4.

(3) The ID codes of the audio sectors that were sent out by the compact disc drive 30 are extracted by the ID extractor 34, and are provided to the retrieval controller 31.

(4) The retrieval controller 31 then enables the sector data extractor 35 to extract appropriate ones of the audio sectors from the interleaved audio sectors of the selected one of the blocks (e.g. Block 0) when the ID codes thereof are recognized as belonging to a selected one of the audio programs (e.g. P0).

(5) When an end-of-program (EOP) flag in the ID code of the last one of the audio sectors of the selected one of the audio programs (e.g. P0) in the selected one of the blocks (e.g. Block 0) is recognized, the retrieval controller 31 enables the compact disc drive 30 to send out the audio sectors of another one of the blocks (e.g. Block 1) in the selected one of the tracks (e.g. Track 0).

(6) Steps (3) and (4) are repeated to enable the sector data extractor 35 to extract the audio sectors that belong to a selected one of the audio programs (e.g. P0) from the interleaved audio sectors of said another one of the blocks (e.g. Block 1).

(7) Steps (5) and (6) are repeated to enable the sector data extractor 35 to extract the audio sectors that belong to a selected one of the audio programs (e.g. P0) of other ones of the blocks (e.g. Block 2–Block q) in the selected one of the tracks (e.g. Track 0) until the end-of-program (EOP) flag in the ID code of the last one of the audio sectors of the selected one of the audio programs (e.g. P0) in the last one of the blocks (e.g. Block q) of the selected one of the tracks (e.g. Track 0) is recognized.

(8) Thereafter, the retrieval controller 31 enables the compact disc drive 30 to resend the audio sectors of the selected one of the tracks (e.g. Track 0) of the record carrier 4.

(9) Steps (3) to (7) are then repeated to enable the sector data extractor 35 to extract the audio sectors of another one of the audio programs (e.g. P1) in each of the blocks (e.g. Block 0–Block q).

(10) Steps (8) and (9) are repeated to enable the sector data extractor 35 to extract the audio sectors of other ones of the audio programs (e.g. P2–P5) in each of the blocks (e.g. Block 0–Block q) until an end-of-track (EOT) flag in the ID code of the last one of the audio sectors of the last one of the audio programs (e.g. P5) in the last one of the blocks (e.g. Block q) of the selected one of the tracks (e.g. Track 0) is recognized.

(11) Subsequently, the retrieval controller 31 enables the compact disc drive 30 to send out the audio sectors of another one of the tracks (e.g. Track 1) of the record carrier 4.

(12) Steps (3) to (10) are repeated to enable the sector data extractor 35 to extract the audio sectors of the audioprograms (e.g. P0–P5) in the blocks (e.g. Block 0–Block q) of said another one of the tracks (e.g. Track 1) of the record carrier 4.

(13) Steps (11) and (12) are repeated to enable the sector data extractor 35 to extract the audio sectors of the audio programs (e.g. P0–P5) in the blocks (e.g. Block 0–Block q) of other ones of the tracks (e.g. Track 2–Track p) of the record carrier 4 until an end-of-disc (EOD) flag in the ID code of the last one of the audio sectors of the last one of the audio programs (e.g. P5) in the last one of the blocks (e.g. Block q) of the last one of the tracks (e.g. Track p) is recognized.

Figure 7:
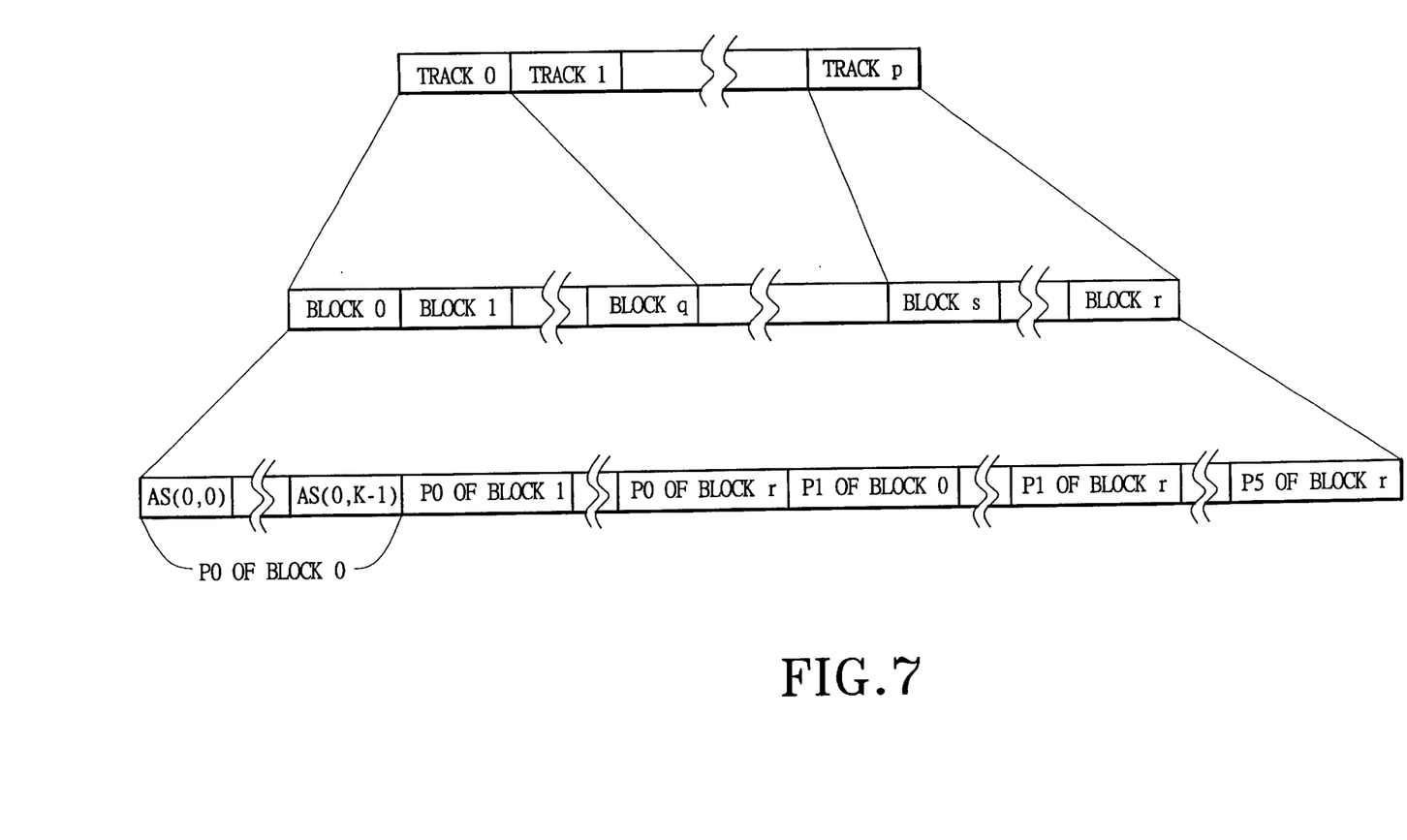
FIG. 7 illustrates a further embodiment of how audio sectors are retrieved for playback of audio programs that were recorded on the tracks of the record carrier of FIGS. 1 to 3.

FIG. 7 illustrates still another embodiment of how audio sectors are retrieved for playback of audio programs that were recorded on the tracks of the record carrier of FIGS. 1 to 3. Each track includes (q+1) blocks. The first track of the record carrier, e.g. Track 0, starts from Block 0 and ends at Block q. The last track of the record carrier, e.g. Track p, starts from Block s and ends at Block r. The number of audio programs in each block of the record carrier is fixed. Preferably, the number of audio programs in each block of the record carrier is equal to six.

The playback sequence is conducted by retrieving one audio program (e.g. P0) from each block in one turn of advancing the whole record carrier. That is, continuous playback from Track 0 to Track p constitutes one turn of advancing the whole record carrier. In the second turn of advancing the whole record carrier, all of the interleaved audio sectors are resent, and another audio program (e.g. P1) is retrieved from each of the blocks. Advancing the whole record carrier is repeated for several more turns until the last audio program of the last block of the last track has been retrieved, thereby resulting in the need to send the audio sectors of the whole record carrier six times to retrieve the audio programs in the latter. Thus, the number of times audio sectors are resent for playback of all of the audio programs recorded on the record carrier is fewer than that in the previous embodiments.

As with the previous embodiments, the retrieval process is under the control of the retrieval controller 31 of FIG. 4. The retrieval controller 31 controls the compact disc drive 30 to send out the audio sectors of the entire record carrier 4 repeatedly for a number of times equal to the number of the audio programs in each of the blocks. The retrieval controller 31 further controls the sector data extractor 35 to extract the audio sectors of one of the audio programs in each of the blocks of each of the tracks each time the audio sectors of the entire record carrier 4 are sent out by the compact disc drive 30.

With reference to FIG. 7, the third preferred embodiment of a playback method according to the present invention comprises the following steps:

(1) Initially, the retrieval controller 31 detects the playback command from the playback sequencer 38.

(2) Upon detecting the playback command, the retrieval controller 31 enables the compact disc drive 30 to send out the audio sectors of a selected one of the blocks (e.g. Block 0) of a selected one of the tracks (e.g. Track 0) of the record carrier 4.

(3) The ID codes of the audio sectors that were sent out by the compact disc drive 30 are extracted by the ID extractor 34, and are provided to the retrieval controller 31.

(4) The retrieval controller 31 then enables the sector data extractor 35 to extract appropriate ones of the audio sectors from the interleaved audio sectors of the selected one of the blocks (e.g. Block 0) when the ID codes thereof are recognized as belonging to a selected one of the audio programs (e.g. P0).

(5) When an end-of-program (EOP) flag in the ID code of the last one of the audio sectors of the selected one of the audio programs (e.g. P0) is recognized, the retrieval controller 31 enables the compact disc drive 30 to send the audio sectors of another one of the blocks (e.g. Block 1) of the selected one of the tracks (e.g. Track 0).

(6) Steps (3) and (4) are repeated to enable the sector data extractor 35 to extract the audio sectors that belong to a selected one of the audio programs (e.g. P0) from the interleaved audio sectors of said another one of the blocks (e.g. Block 1).

(7) Steps (5) and (6) are then repeated to enable the sector data extractor 35 to extract the audio sectors that belong to a selected one of the audio programs (e.g. P0) of other ones of the blocks (e.g. Block 2–Block q) of the selected one of the tracks (e.g. Track 0) until an end-of-program (EOP) flag in the ID code of the last one of the audio sectors of the selected one of the audioprograms (e.g. P0) in the last one of the blocks (e.g. Block q) of the selected one of the tracks (e.g. Track 0) is recognized.

(8) Thereafter, the retrieval controller 31 enables the compact disc drive 30 to send out the audio sectors of one of the blocks (e.g. Block 0) of another one of the tracks (e.g. Track 1) of the record carrier 4.

(9) Steps (3) to (7) are then repeated to enable the sector data extractor 35 to extract the audio sectors of a selected one of the audio programs (e.g. P0) in each of the blocks (e.g. Block 0–Block q) of said another one of the tracks (e.g. Track 1).

(10) Steps (8) and (9) are repeated to enable the sector data extractor 35 to extract the audio sectors of a selected one of the audio programs (e.g. P0) in each of the blocks (e.g. Block 0–Block q) of other ones of the tracks (e.g. Track 2–Track p) until the end-of-program (EOP) flag in the ID code of the last one of the audio sectors of the selected one of the audio programs (e.g. P0) in the last one of the blocks (e.g. Block q) of the last one of the tracks (e.g. Track p) of the record carrier 4 is recognized.

(11) Subsequently, the retrieval controller 31 enables the compact disc drive 30 to resend the audio sectors of the tracks (e.g. Track 0–Track p) of the record carrier 4.

(12) Steps (3) to (10) are repeated to enable the sector data extractor 35 to extract the audio sectors of another one of the audio programs (e.g. P1) in each of the blocks (e.g. Block 0–Block q) in each of the tracks (e.g. Track 1–Track p) of the record carrier 4.

(13) Steps (11) and (12) are repeated to enable the sector data extractor 35 to extract the audio sectors of other ones of the audio programs (e.g. P2–P5) in each of the blocks (e.g. Block 0–Block q) in each of the tracks (e.g. Track 0–Track p) of the record carrier 4 until an end-of-disc (EOD) flag in the ID code of the last one of the audio sectors of the last one of the audio programs (e.g. P5) in the last one of the blocks (e.g. Block q) of the last one of the tracks (e.g. Track p) is recognized.

Although only three playback methods are illustrated in the preceding embodiments, it should be noted that the three playback methods can be flexibly combined to retrieve the audio programs recorded on the record carrier. The retrieval controller of the playback apparatus of this invention can be programmed to achieve the versatile combinations.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An audio playback system comprising:
a record carrier having at least one track, the track having at least one block, the block including a plurality of interleaved audio programs and being grouped into a number of consecutive sub-blocks, each of the audio programs being segmented to form a number of consecutive audio sectors that is equal in number to the sub-blocks, the audio sectors of the audio programs being recorded on the record carrier in a predetermined order and being arranged among the sub-blocks such that a jth one of the audio sectors of each of the audio programs is disposed in a jth one of the sub-blocks, thereby disposing each of the audio sectors adjacent to an audio sector of a different audio program, each of the audio sectors including an ID field for storing an ID code that is unique for each of the audio sectors, and a data field;

drive means for reading the audio sectors of said interleaved audio programs in the predetermined order recorded on the record carrier at a relatively constant linear velocity when said drive means is loaded with said record carrier, and sending out the audio sectors;

an ID extractor connected to said drive means for extracting the ID codes of the audio sectors that were sent out by said drive means;

a retrieval controller connected to said ID extractor to receive said ID codes extracted thereby; and a sector data extractor connected to said drive means and said retrieval controller, said sector data extractor receiving said data fields of said audio sectors that were sent out by said drive means, and being controlled by said retrieval controller to extract said data fields of appropriate ones of said audio sectors when the ID codes thereof are recognized by said retrieval controller as belonging to a selected one of the audio programs.

2. The audio playback system of claim 1, wherein said drive means includes a compact disc drive.

3. The audio playback system of claim 1, wherein each of said audio sectors further includes an error management code field for storing an error management code, said audio playback system further comprising an error management processor connected to said drive means and said sector data extractor, said error management processor receiving said error management codes of said audio sectors that were sent out by said drive means and performing an error management operation on said data fields of said audio sectors before providing said data fields of said audio sectors to said sector data extractor.

4. The audio playback system of claim 3, wherein each of said audio sectors further includes a SYNC field for storing a SYNC word, said audio playback system further comprising a SYNC detector connected to said drive means, said ID extractor, and said error management processor, said SYNC detector activating said ID extractor and said error management processor upon receiving said SYNC words of said audio sectors that were sent out by said drive means.

5. The audio playback system of claim 1, further comprising a first in, first out memory device connected to said sector data extractor for storing said data fields extracted thereby.

6. The audio playback system of claim 5, further comprising an audio decompressor connected to said first in, first out memory device for decompressing said data fields stored therein.

7. The audio playback system of claim 1, wherein said track of said record carrier has a plurality of said blocks, said retrieval controller being connected to said drive means and controlling said drive means to send out said audio sectors of one of said blocks repeatedly for a number of times equal to the number of said audio programs in each of said blocks, said retrieval controller further controlling said sector data extractor to extract said audio sectors of one of said audio programs in said one of said blocks each time said audio sectors of said one of said blocks are sent out by said drive means.

8. The audio playback system of claim 1, wherein said record carrier has a plurality of said tracks, each of said tracks having a plurality of said blocks, said retrieval controller being connected to said drive means and controlling said drive means to send out said audio sectors of one of said tracks repeatedly for a number of times equal to the number of said audio programs in each of said blocks, said retrieval controller further controlling said sector data extractor to extract said audio sectors of one of said audio programs in each of said blocks of said one of said tracks each time said audio sectors of said one of said tracks are sent out by said drive means.

9. The audio playback system of claim 1, wherein said record carrier has a plurality of said tracks, each of said tracks having a plurality of said blocks, said retrieval controller being connected to said drive means and controlling said drive means to send out said audio sectors of the entire record carrier repeatedly for a number of times equal to the number of said audio programs in each of said blocks, said retrieval controller further controlling said sector data extractor to extract said audio sectors of one of said audio programs in each of said blocks of each of said tracks each time said audio sectors of the entire record carrier are sent out by said drive means.

10. An audio playback system comprising:

a record carrier having tracks, each track having blocks, each block including a plurality of interleaved audio programs, each audio programs being segmented into a predefined number of audio sectors, the audio sectors of the audio programs being stored on the disk in an order such that a j-th one of the audio sectors of each of the audio programs is disposed in a j-th one of the sub-blocks, thereby disposing each of the audio sectors adjacent to an audio sector of a different audio program, each of the audio sectors including an ID field for storing a data field and an ID code that is unique for each of the audio sectors, the arrangement of the storage of the audio sectors of the interleaved audio programs in the blocks being applied throughout the record carrier regardless of whether the audio sectors are stored near a center portion of the record carrier or a peripheral portion of the record carrier;

a record carrier reader for reading the audio sectors of the interleaved audio programs in the predetermined order recorded on the record carrier at a relatively constant linear velocity and sending out the audio sectors;

an ID extractor connected to the record carrier reader for extracting the ID codes of the audio sectors that were sent out by the record carrier reader;

a retrieval controller connected to said ID extractor to receive the ID codes extracted thereby; and a sector data extractor connected to the record carrier reader and the retrieval controller, the sector data extractor receiving the data fields of the audio sectors that were sent out by the record carrier reader, and being controlled by the retrieval controller to extract the data fields of appropriate ones of the audio sectors when the ID codes thereof are recognized by the retrieval controller as belonging to a selected one of the audio programs.

11. The audio playback system of claim 10 therein the record carrier comprises a disk having concentric circular tracks.

12. An audio playback system comprising:

a record carrier configured to store groups of interleaved audio programs, each audio program within a group being divided into the same number of audio segments, the record carrier having tracks, each tracks having blocks, each block having sub-blocks, each sub-block having sectors, each sector having a data field that stores an audio segment and an ID field that stores an ID code identifying which audio program the audio segment belongs, the sectors within the same sub-block storing audio segments from audio programs within the same group, each sub-block storing one audio segment from each audio program within the same group, the audio segments of an audio program being stored in sectors of consecutive sub-blocks;

a record carrier reader configured to read and sent out the sectors of the record carrier at a relatively constant linear velocity in either one of three modes,
   in the first mode the reader being configured to read sectors storing audio segments of a first audio program in a first block, then read sectors storing audio segments of a second audio program in the first block, then read sectors storing audio segments of other audio programs in the first block in like manner until all sectors within the block have been read, then read the sectors storing audio segments of the first audio program in the second block, then read sectors storing audio segments of the second audio program in the second block, then read sectors storing audio segments of other audio programs in the second block in like manner until all sectors in the second block have been read, then read sectors in successive blocks in like manner until all sectors storing audio segments of the first and second audio programs and other audio programs belonging to the same group have been read,
   in the second mode the reader being configured to read sectors storing audio segments of the first audio program in a first track, then read sectors storing audio segments of the second audio program in the first track, then read sectors storing audio segments of other audio programs in the first track in like manner until all sectors in the first track have been read, then read sectors storing audio segments of the first audio program in the second track, then read sectors storing audio segments of the second audio program in the second track, then read sectors storing audio segments of other audio programs in the second track in like manner until all sectors in the second track have been read, then read sectors storing audio segments in successive tracks in like manner until all sectors storing audio segments of the first and second audio programs and other audio programs belonging to the same group have been read,
   in the third mode the reader being configured to read all sectors storing audio segments of the first audio program, then read all sectors storing audio segments of the second audio program, then read sectors storing audio segments of other audio programs in like manner until all sectors storing audio segments of audio programs belonging to the same group have been read;

an ID extractor connected to the record carrier reader to extract the ID codes of the sectors from the reader; and a sector data extractor configured to receive the audio sectors from the record carrier reader and to extract data fields of the audio sectors when the corresponding ID codes identify the audio segments stored in the data fields as belonging to a selected one of the audio programs.

\* \* \* \* \*